United States Patent
Koenen et al.

(10) Patent No.: US 9,917,460 B2
(45) Date of Patent: Mar. 13, 2018

(54) LITHIUM ION BATTERY PACK FOR OUTDOOR POWER EQUIPMENT

(71) Applicant: Briggs & Stratton Corporation, Wauwatosa, WI (US)

(72) Inventors: Robert John Koenen, Pewaukee, WI (US); Jason Hansen, Elkhorn, WI (US); Andrew Paskov, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 99 days.

(21) Appl. No.: 14/963,455

(22) Filed: Dec. 9, 2015

(65) Prior Publication Data
US 2016/0233694 A1 Aug. 11, 2016

Related U.S. Application Data

(60) Provisional application No. 62/089,306, filed on Dec. 9, 2014.

(51) Int. Cl.
*H02J 7/14* (2006.01)
*H02J 7/00* (2006.01)
(Continued)

(52) U.S. Cl.
CPC ............ *H02J 7/0054* (2013.01); *F02N 11/14* (2013.01); *H01M 10/0525* (2013.01);
(Continued)

(58) Field of Classification Search
CPC .. H02J 7/0054; H02J 7/0024; H02J 2001/006; F02N 11/14
(Continued)

(56) References Cited

U.S. PATENT DOCUMENTS 4,754,730 A * 7/1988 Campagna .......... F02N 11/0866
123/179.28
5,459,389 A 10/1995 Fujiwara et al.
(Continued)

FOREIGN PATENT DOCUMENTS

EP 2110921 10/2009
FR 2996965 4/2014

OTHER PUBLICATIONS

International Search Report and Written Opinion for International Application No. PCT/US2015/064619 dated Jul. 12, 2016.

*Primary Examiner* — David V Henze-Gongola
(74) *Attorney, Agent, or Firm* — Andrus Intellectual Property Law, LLP

(57) ABSTRACT

A battery pack for use to provide starting power of an internal combustion engine. The battery pack includes an outer housing that encloses a plurality of individual battery cells organized into two battery groups. A charging circuit is contained within the outer housing, which allows the battery cells to be recharged without the need for a charging device other than the battery pack. The charging circuit allows the battery cells to be recharged from either a wall outlet or from the alternator of the internal combustion engine. The battery pack further includes a switching circuit that can configure the battery groups in either a parallel mode or a series mode. In the series mode, the output voltage of the battery pack is increased for starting a cold engine. In the parallel mode, the amount of current available from the battery pack is increased.

13 Claims, 6 Drawing Sheets

(51) Int. Cl.
 *F02N 11/14* (2006.01)
 *H01M 10/0525* (2010.01)
 *H01M 10/42* (2006.01)
 *H01M 10/46* (2006.01)
 *H02J 1/00* (2006.01)

(52) U.S. Cl.
 CPC ......... *H01M 10/425* (2013.01); *H01M 10/46* (2013.01); *H02J 7/0013* (2013.01); *H02J 7/0024* (2013.01); *H02J 7/0042* (2013.01); *H02J 7/0052* (2013.01); *H01M 2010/4271* (2013.01); *H01M 2220/20* (2013.01); *H02J 2001/006* (2013.01); *Y02E 60/122* (2013.01)

(58) Field of Classification Search
 USPC .................................. 320/103–105
 See application file for complete search history.

(56) References Cited

U.S. PATENT DOCUMENTS

| | | | |
|---|---|---|---|
| 6,094,029 A | | 7/2000 | Reynolds et al. |
| 6,155,870 A | * | 12/2000 | Valentine ............ H01M 2/1072 439/501 |
| 9,127,658 B2 | | 9/2015 | Koenen et al. |
| 2003/0011344 A1 | * | 1/2003 | Bertness ............... H02J 7/0054 320/103 |
| 2007/0285049 A1 | | 12/2007 | Krieger et al. |
| 2014/0152257 A1 | | 6/2014 | Miller et al. |
| 2015/0263390 A1 | * | 9/2015 | Gagneur ............... H02J 7/0016 429/50 |

* cited by examiner

LITHIUM ION BATTERY PACK FOR OUTDOOR POWER EQUIPMENT

CROSS-REFERENCE TO RELATED APPLICATION

The present application is based on and claims priority to U.S. Provisional Patent Application Ser. No. 62/089,306 filed Dec. 9, 2014, the disclosure of which is incorporated herein by reference.

BACKGROUND

The present disclosure relates to a lithium ion battery pack for use with a starting circuit for outdoor power equipment, such as a lawn tractor. More specifically, the present disclosure relates to a battery pack that includes an internal charging circuit and multiple cells that can be configured for either starting the engine or operating electrical components of the lawn tractor after starting.

Presently, many different types of outdoor power equipment include electronic starting circuits that allow the user to start the internal combustion engine of the outdoor power equipment through either a key switch or a push button. Most of these starting systems include a lead acid battery that provides the voltage and current required for activating the starting system of the outdoor power equipment. In many cases, the lead acid battery is a 12-volt battery that is recharged during operation of the outdoor power equipment.

Although lead acid batteries have been used for a very long time and are relatively inexpensive, if the voltage stored by the lead acid battery is completely depleted, the lead acid battery may become ineffective at storing a charge and would thus need to be replaced. Since many pieces of outdoor power equipment can sit idle for extended periods of time, if the lead acid battery is not removed and kept charged, the lead acid battery can become completely discharged and thus must be replaced. In cases of newly purchased equipment, this replacement may fall under the manufacturer's warranty and would need to be replaced by the manufacturer.

Presently, many types of lawn and garden equipment utilize a lithium ion battery pack to provide power for the lawn and garden equipment. As an example, leaf blowers, weed trimmers and edgers often use lithium battery packs to provide power for the equipment Once the equipment is no longer in use, the lithium ion battery pack is removed and recharged utilizing a wall charger. Lithium ion battery packs can be completely discharged and subsequently recharged without any significant reduction in the storage capacity of the battery. However, lithium ion battery packs are significantly more expensive than lead acid batteries.

SUMMARY

The present disclosure relates to a starter battery pack for use with a piece of outdoor power equipment, such as a lawn tractor. More specifically, the starter battery pack includes an internal charging circuit such that the starter battery pack can be connected directly to a wall outlet for recharging and a switching circuit to change the connection between the battery cells.

In one embodiment of the disclosure, the battery pack used to start an internal combustion engine includes an enclosed outer housing. The outer housing encloses a plurality of battery cells. The battery cells can be organized into two battery groups where each of the battery groups includes a plurality of battery cells. In one embodiment, the battery cells are lithium ion battery cells.

The battery pack further includes a charging circuit that is contained within the outer housing such that the battery pack is a self contained unit. The charging circuit allows the battery cells to be charged without the need for any external battery charging equipment. The charging circuit can be electrically connected to a source of wall power or to the alternator of the internal combustion engine. In this manner, the battery pack can be recharged either by connecting the battery pack to a conventional wall outlet or to contacts coupled to the alternator of the internal combustion engine.

The battery pack can include a pair of prongs to allow the battery pack to be received in a wall outlet. In one embodiment, the pair of prongs is retractable from within the outer housing of the battery pack.

In another embodiment of the disclosure, the battery pack used to start the internal combustion engine includes an enclosed outer housing. The outer housing encloses a plurality of battery cells. The battery cells can be organized into two battery groups where each of the battery groups includes a plurality of battery cells. In one embodiment, the battery cells are lithium ion battery cells. The battery pack further includes a switching circuit that is connected to both the first and second battery groups. The switching circuit is operable to selectively connect the first and second battery groups in either a parallel mode or a series mode. In the series mode, the output voltage and power of the battery pack is increase for starting the engine, especially in a cold weather. In the parallel mode, the output voltage is decreased to increase the time the battery pack will retain a charge.

The switching circuit includes a plurality of switching devices and a switching control unit. The switching control unit controls the position of the switching devices to transition between the parallel and series modes. In one embodiment, the switching devices are MOSFETs or some other type of silicon switching device while in a second embodiment, the switching devices are relays. In each case, the switching control unit controls the state of the switching device through a signal from the switching control unit.

In another embodiment of the disclosure, the battery pack used to start an internal combustion engine includes an enclosed outer housing. The outer housing encloses a plurality of battery cells. The battery cells can be organized into two battery groups where each of the battery groups includes a plurality of battery cells. The battery pack further includes a charging circuit that is contained within the outer housing such that the battery pack is a self contained unit. The charging circuit allows the battery cells to be charged without the need for any external battery charging equipment. The charging circuit can be electrically connected to a source of wall power or to the alternator of the internal combustion engine. In this manner, the battery pack can be recharged either by connecting the battery pack to a conventional wall outlet or to contacts coupled to the alternator of the internal combustion engine. The battery pack further includes a switching circuit that is connected to both the first and second battery groups. The switching circuit is operable to selectively connect the first and second battery groups in either a parallel mode or a series mode. In the series mode, the output voltage and power of the battery pack is increase for starting the engine, especially in a cold weather. In the parallel mode, the output voltage is decreased to increase the time the battery pack will retain a charge.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
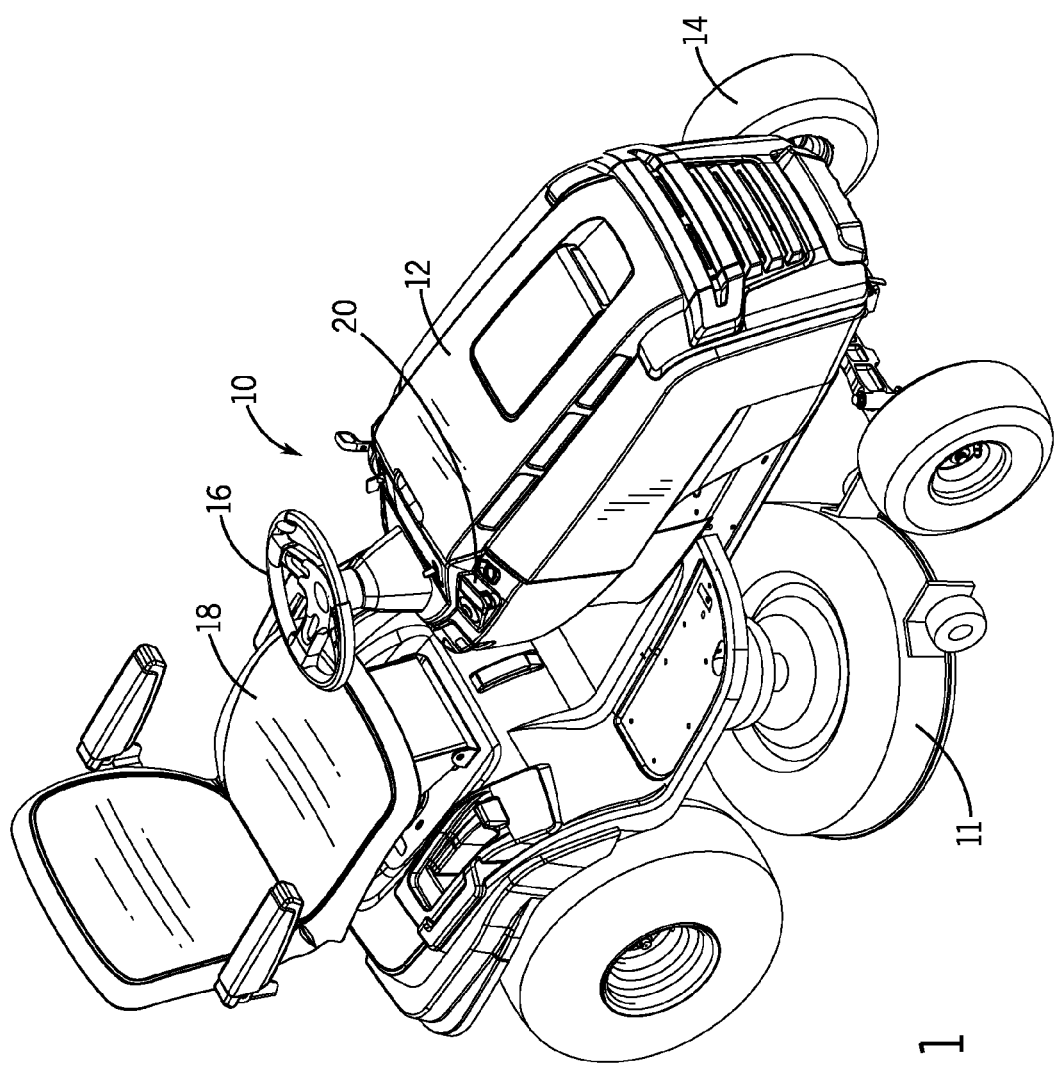
FIG. 1 is a front perspective view of a lawn tractor incorporating the starter battery of the present disclosure.

The present disclosure is directed to a starting system for an internal combustion engine of a lawn tractor. The drawing figures depict the use of the starting system with a lawn tractor. However, it should be understood that the starting system could be utilized with other types of outdoor power equipment while falling within the scope of the present disclosure.

FIG. 1 illustrates a riding lawn tractor 10 that includes a mowing assembly 11 mounted beneath a vehicle chassis 12 supported by four wheels 14. The lawn tractor 10 includes an internal combustion engine (not shown) that powers both the rear drive wheels and the mower blade contained within the mowing assembly 11. A steering wheel 16 allows an operator positioned in the seat 18 to control the movement of the lawn tractor 10, as is conventional. The details of the lawn tractor 10 shown in FIG. 1 are meant of illustrative purposes only, since the lawn tractor 10 could have various different operator controls and physical configurations while falling within the scope of the present disclosure.

Figure 2:
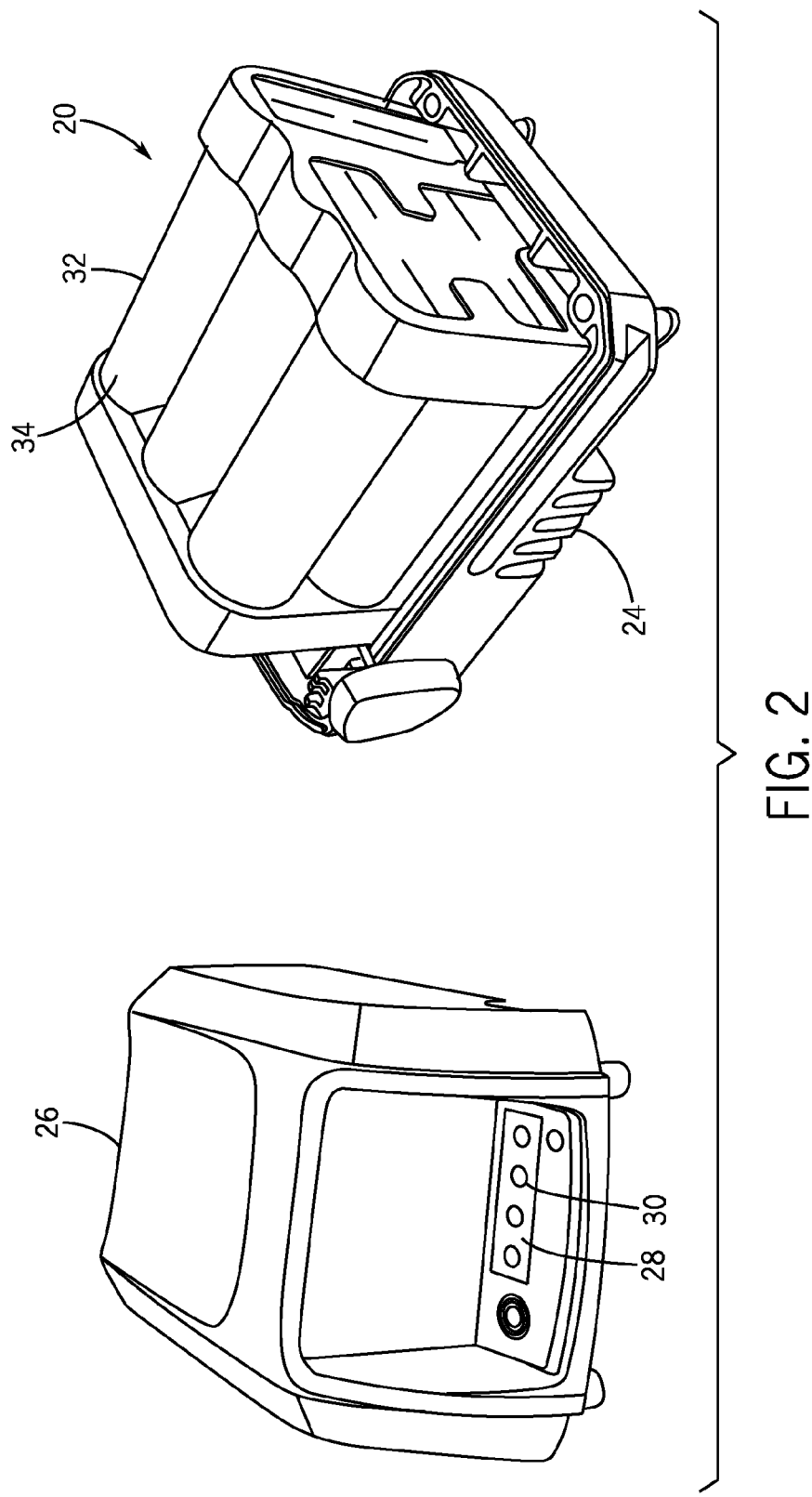
FIG. 2 is a perspective view of the starter battery pack with the top portion of the housing removed.

FIG. 2 illustrates a starter battery pack 20 constructed in accordance with one embodiment of the present disclosure. The starter battery pack 20 includes a two-piece outer battery housing 22 that includes a bottom portion 24 and a top portion 26. The top portion 26 includes a power level display 28 that includes a plurality of individual indicator lights 30. Although the embodiment shown in FIG. 2 includes multiple indicator lights 30, it is contemplated that the multiple indicator lights 30 could be replaced by a single LED that changes color depending upon the charge stored on the internal battery cell. As an example, the indicator lights 30 could be replaced by a single LED that changes color from green to yellow to red, depending upon the state of charge on the internal battery pack. Alternatively, the multiple indicator lights 30 could be replaced by a single LED that flashes, remains on in a steady state, or is turned off depending upon the charge level of the battery pack 20. Such embodiment would allow for a single color LED.

In the embodiment shown in FIG. 2, the battery pack 32 includes six individual cells 34 that are organized and connected to each other and are contained within the outer battery housing 22, as will be described in greater detail below. In the embodiment shown in FIG. 2, the six individual cells 34 are stacked in two rows each including three cells. However, it is contemplated that other configurations could be utilized while operating within the scope of the present disclosure. The size of the outer battery housing 22 is increased to accommodate the six battery cells 34, which provides for additional interior space for the charging circuit and switching circuit to be described below.

Figure 3:
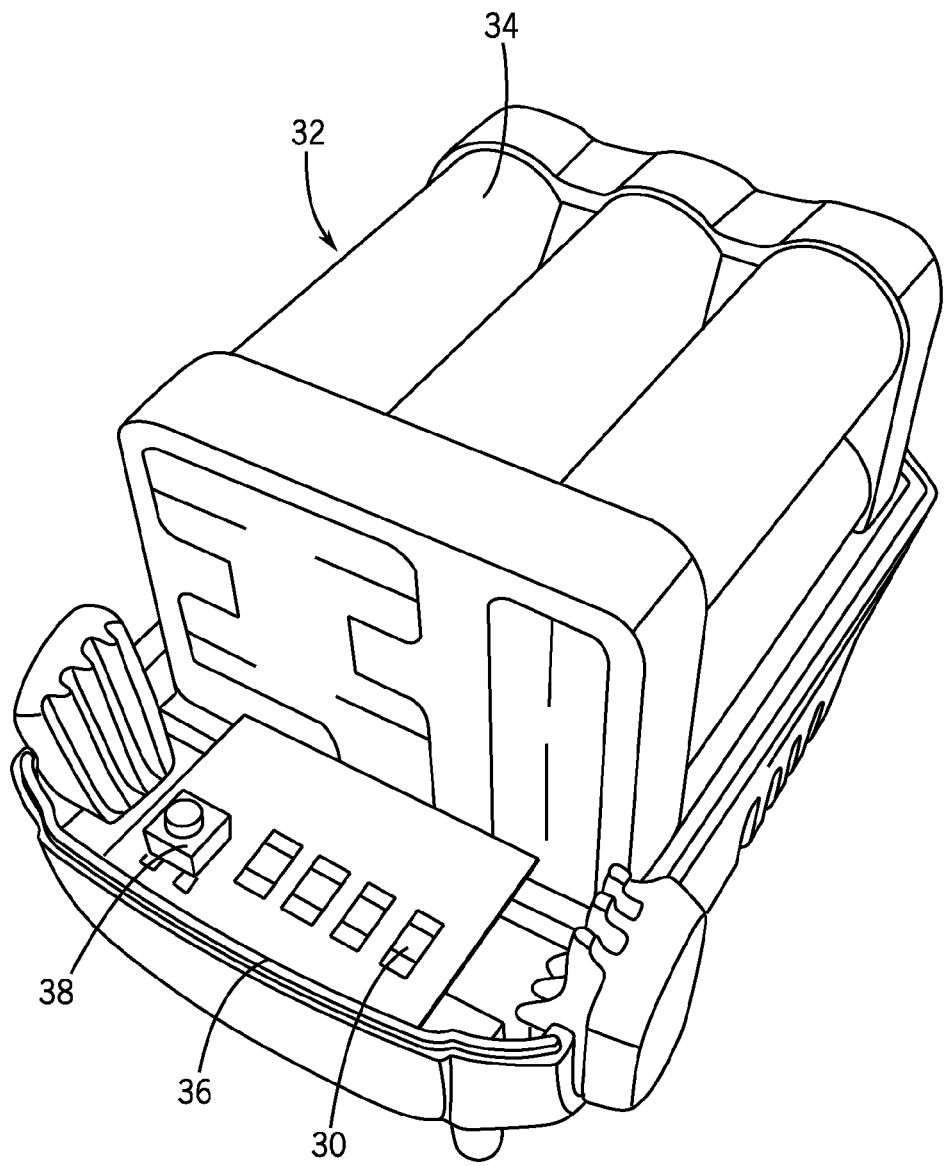
FIG. 3 is a perspective view of the starter battery pack with the top portion of the housing removed.

FIG. 3 illustrates the circuit board 36 that includes the indicator lights 30. In addition, the circuit board 36 includes an activation switch 38 that allows the user to test the charge of the battery pack 32. The circuit board 36 provides a mounting platform for the charging circuit and switching circuit describe below.

In the embodiment illustrated, each of the individual cells 34 of the starter battery pack 32 can be one of two different types of storage cells. In one embodiment, each of the cells 34 is a common lithium ion battery, referred to as an NMC (nickel magnesium cobalt) battery. Each of the NMC battery cells has a rating of 3.6 volts. In a second embodiment, each of the battery cells could be another type of lithium ion battery referred to as a lithium iron phosphate cell (LiFePO4, LFP). A lithium iron phosphate ("LFP") battery is a type of lithium ion rechargeable battery that is typically used for high power applications. An LFP battery allows for reduced protection circuitry as compared to an NMC battery, but typically offers a longer lifetime, better power density and is inherently safer. An LFP battery has a typical maximum charge capacity of 3.2 volts each in the embodiment shown in FIG. 3. In the present disclosure, both the LFP and NMC battery cells will be referred to as lithium ion battery cells.

In the embodiment illustrated, the six individual cells 34 of the starter battery pack 32 are believed to be able to provide enough current to start an internal combustion engine of the lawn tractor many times, which means that there will be a relative significant amount of time between charges. Thus, it is contemplated that the starter battery pack 32 may need to be recharged only once a year or once every several years. Since the lithium ion battery 32 pack may not need to be charged on a regular basis, providing an expensive charging circuit external to the battery pack will be unnecessary.

Lithium ion battery packs typically include a series of contacts that allows the battery pack to be recharged utilizing a charging station that is connected to a supply of 120-volt utility power. U.S. Pat. No. 9,127,658 illustrates such a charging station and contacts for a lithium ion battery pack, the disclosure of which is incorporated herein by reference.

Although such battery charging circuits work well to recharge a lithium ion battery pack, the battery charger can often become lost or misplaced, which can aggravate a user when the battery pack becomes discharged. In accordance with the present disclosure, the battery pack 32 can include a pair of prongs 40 that are mounted to a pivot point 42 such that the prongs 40 can pivot as shown by arrow 44 into and out of the battery housing 22. The direction of pivoting movement can be changed depending upon the size and configuration of the outer battery housing. The pair of prongs 40 can be received directly within a utility wall outlet and will feed a charging circuit 44 contained within the outer housing 22. The charging circuit 44 is connected to the plurality of battery cells 34 such that the entire battery pack 32 can be connected directly to a utility outlet without the need for any separate charging circuit.

Figure 4:
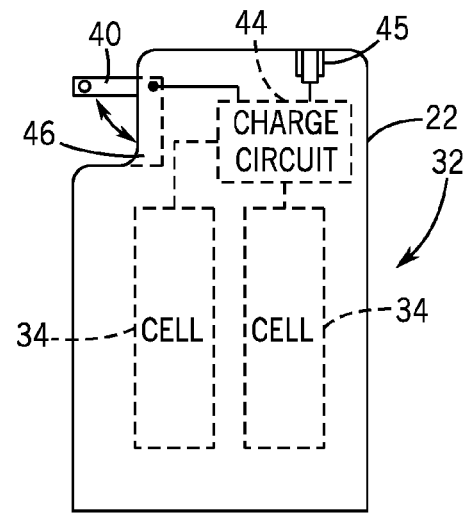
FIG. 4 is a schematic illustration illustrating the movable charging prongs and charging circuit.

It is contemplated that the battery pack 32 could include contacts, separate from the prongs 40, to connect the internal battery cells 34 to the circuitry contained within the lawn tractor. Thus, the battery pack 32 would utilize the same type of electrical contacts to interface with the lawn tractor while also including prongs 40 that can be used to recharge the internal cells 34. In the embodiment shown in FIG. 4, the prongs 40 pivot into a recessed area 46 formed in the outer battery housing 22. It is contemplated that the prongs 40 could also be retracted into the battery housing 22 when the battery pack is in use. The inclusion of the charging circuit 44 and the retractable prongs 40 as part of the battery pack 32 eliminates the need for any external charging circuit while still utilizing the contacts associated with the lawn tractor.

In yet another alternate embodiment, the charging prongs 40 may be fixed and thus not retractable. Although retractable prongs 40 are preferred, the prongs could be fixed in place, which would reduce the storage space required in the battery pack 32 for the retractable prongs. In an embodiment in which the prongs 40 are fixed, the corresponding receiver on the tractor must be designed to include slots for the prongs to slide in when inserted into the receiver.

Figure 9:
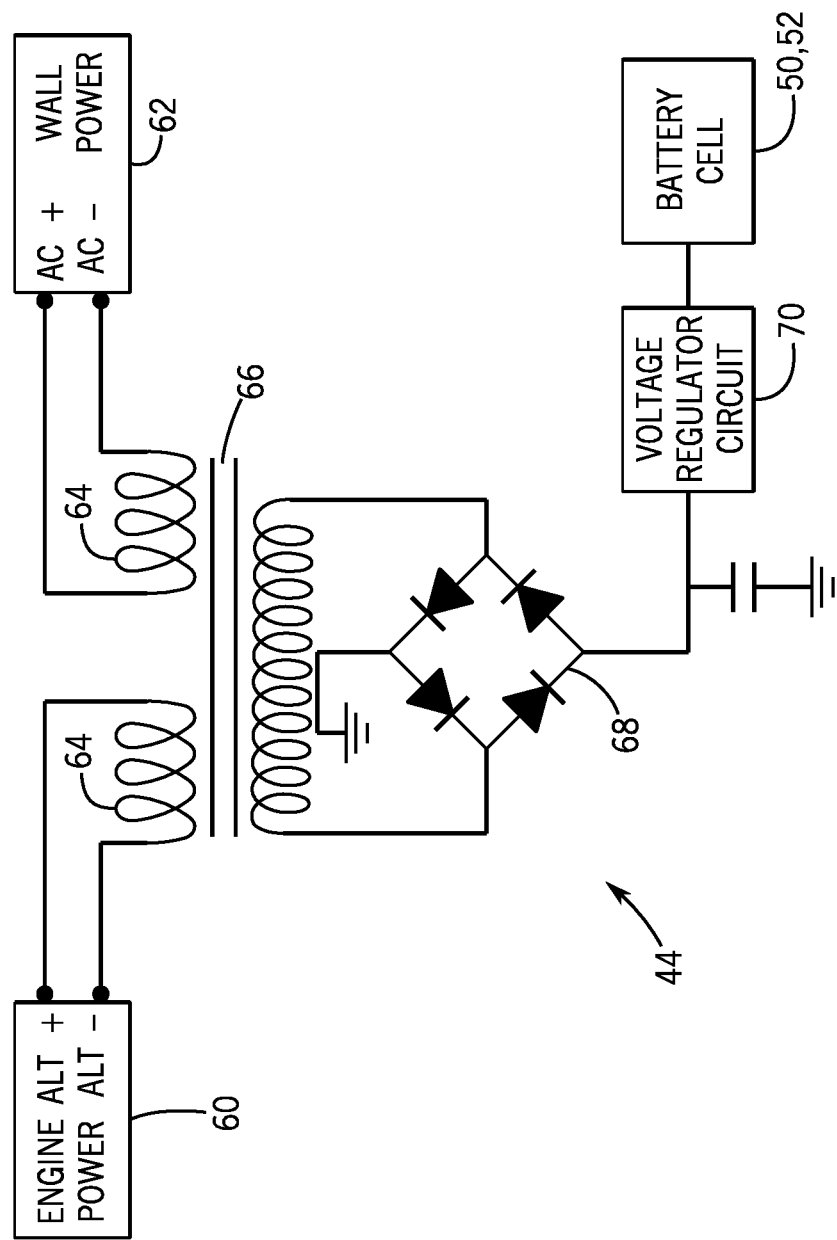
FIG. 9 is a schematic illustration of one embodiment of the battery charging circuit connected to either the alternator of the engine or a wall power supply.

In an embodiment with either fixed or rotating prongs, either the prongs 40 or a pair of other contacts 45 on the battery housing could be used for recharging the battery pack 32 when inserted into the receiver on the tractor or equipment. In such an embodiment, which is schematically shown in FIG. 9, an alternator 60 on the engine included in the tractor outputs an AC waveform. Although the AC waveform may have a lower voltage than a typical home AC power supply, the AC waveform from the engine of the tractor could be used to recharge the battery pack. The AC waveform from the engine is generally much higher in frequency and a universal or smart transformer circuit 66 could be used within the battery pack to account for the difference in frequency and voltage which would allow the battery pack to be charged utilizing either the AC waveform from the engine or from a home utility power supply 62.

Figure 5:
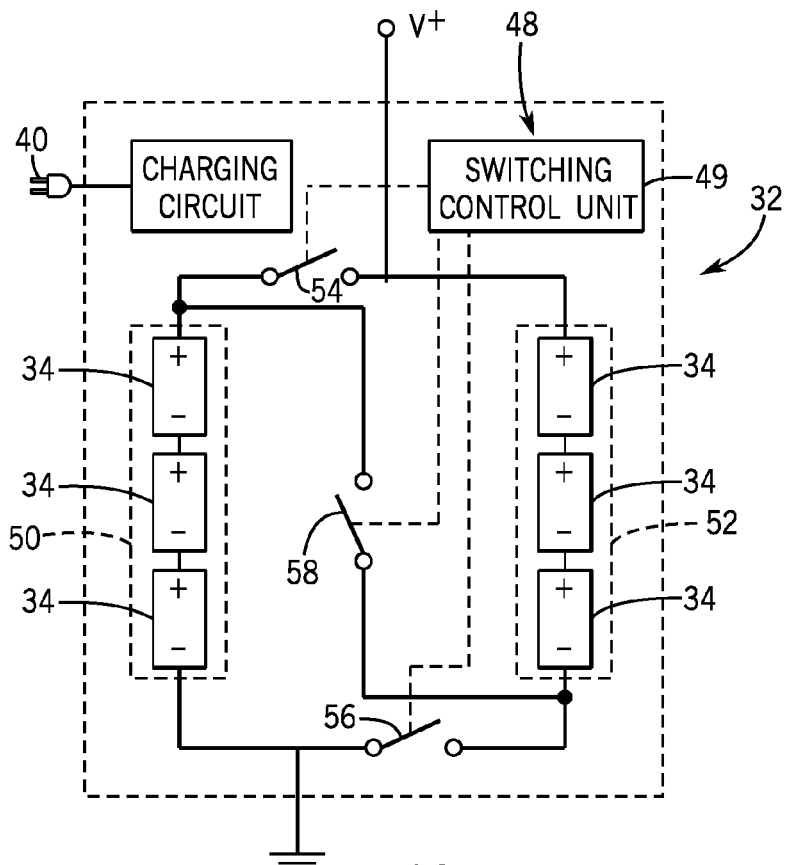
FIG. 5 is a schematic illustration showing the interconnection of the battery cells within the battery pack.

FIG. 5 illustrates another enhancement to the battery pack 32. The embodiment shown in FIG. 5 includes a switching circuit 48 that allows the battery pack to change the configuration of the six individual cells. The switching circuit 48 includes a plurality of switching devices 54, 56 and 58 along with a switching control unit 49. The switching control unit 49 and the switching devices 54, 56 and 58 are mounted to the circuit board contained within the outer housing. The switching control unit is in communication with the tractor through contacts contained on the outer housing to receive operating information from the tractor, including the operating status of the engine and the starting circuit.

In the embodiment shown in FIG. 5, three of the individual cells 34 are connected together in series to create a first battery group 50 while the other three other cells 34 are grouped together to form a second battery group 52. In an embodiment in which each of the cells 34 is an NMC battery, both the first battery group and the second battery group will have a combined voltage of approximately 10.8 volts (referred to as 12 volts) since each of the cells is approximately 3.65 volts. In an embodiment in which the individual cells are LFP cells, each of the first and second battery groups 50, 52 will have a combined voltage of approximately 9.6 volts since each cell has a rating of 3.2 volts.

Figure 6:
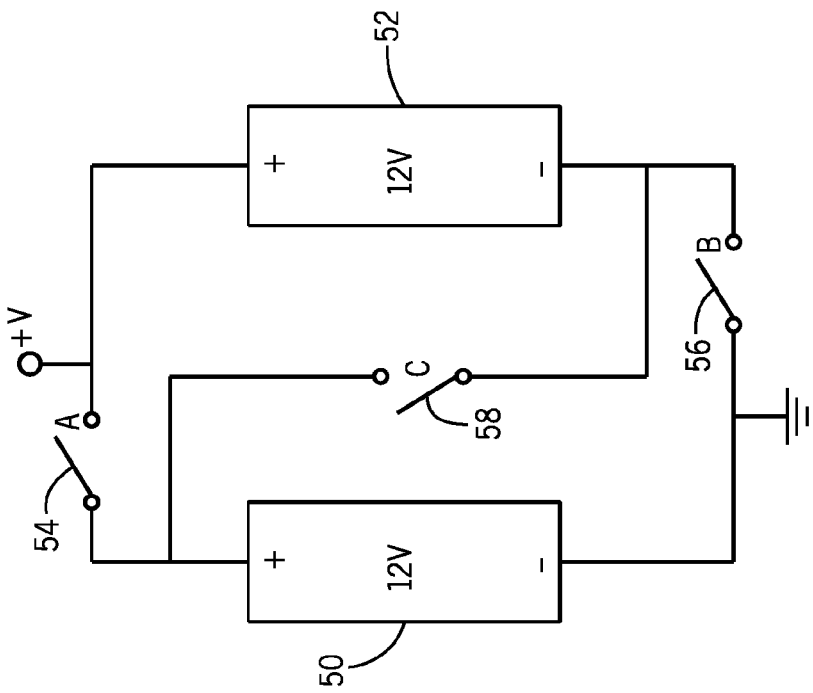
FIG. 6 is a schematic illustration of the connecting switches between the pair of battery groups.

FIG. 6 shows each of the grouped cells as the first battery group 50 and the second battery group 52, each being represented as 12 volts. The first battery group 50 and the second battery group 52 are connected to each other through the three separate switching devices 54, 56 and 58. The switching control unit 49 is in communication with each of the individual switching devices 54, 56 and 58 to selectively open and close the switching devices as desired.

Although simple switch are shown in FIG. 6 as representing the switching devices 54, 56 and 58, it should be understood that these switches could have different embodiments. In one embodiment, each of the switching devices 54, 56 and 58 could be represented by a series of MOSFETs or other similar silicon switching devices that can be switched between on and off states as a result of a voltage signal from the switching control unit 49. In another alternate embodiment, each of the switching devices 54, 56 and 58 could be represented by one or more relays. The position of the relay or relays is controlled by a voltage signal from the switching control unit to control the transition between the parallel mode and the series mode. It is contemplated that various other configurations could be used to switch the battery groups 50 and 52 between the series mode of FIG. 7 and the parallel mode of FIG. 8.

Figure 7:
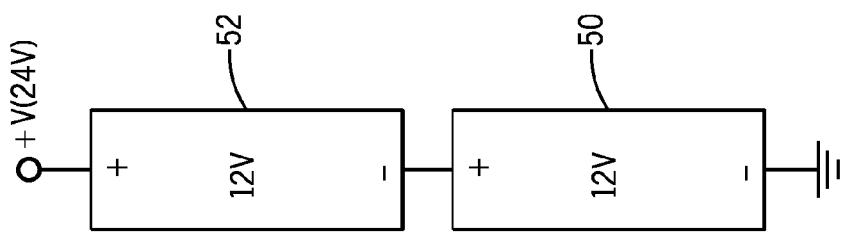
FIG. 7 is a schematic illustration of the battery groups connected in series.

In the series mode, which is shown in FIG. 7, the switching control unit 49 closes switch 58 and allows both of the switches 54 and 56 to remain open. In such a configuration, the first battery group 50 and the second battery group 52 are arranged in series with each other. In such an arrangement, the combined output voltage will be approximately 24 volts, which is double the output voltage of each of the battery groups separately. In this configuration, the combination of the battery groups is able to create a greater power and a greater voltage. A greater amount of current is also possible depending upon the temperature and other engine conditions. The voltage increase of double when in the series configuration assures greater power from the battery pack due to the increased voltage regardless of the conditions that may allow for greater current. The increase in power is beneficial during starting of an internal combustion engine. However, in the series configuration shown in FIG. 7, each of the battery groups 50, 52 will discharge more quickly and the 24 volt output will not be compatible with the normal operating components contained within the lawn tractor. It is contemplated that the switching control unit 49 will configure the battery groups in series as shown in FIG. 7 only during starting of the internal combustion engine.

Figure 8:
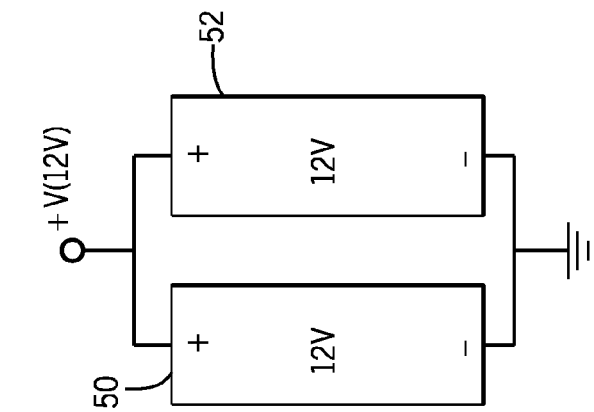
FIG. 8 is a schematic illustration showing the connection of the battery groups in parallel.

The switching control unit 49 can switch the battery groups 50, 52 to a parallel configuration as shown in FIG. 8 at different times, as will be discussed below. In the parallel configuration embodiment shown in FIG. 8, the output voltage will be 12 volts and the total amount of current available will be increased. To configure the battery groups as shown in FIG. 8, the control circuit opens switch 58 while closing switches 54 and 56. It is contemplated that the battery groups 50, 52 would be configured in the parallel mode shown in FIG. 8 during normal operation of the lawn tractor such that the battery groups 50, 52 can supply current to the electrical components contained on the lawn tractor, such as the lights, horn, display and other components. The switching control unit 49 could be configured to switch back and forth between series and parallel modes to optimize engine speed during the starting operation. However, the battery configuration would return to the parallel configuration at the completion of the starting operation to return to voltage compatibility with the electric loads on the tractor.

The control of the switching between the parallel and series configurations shown in FIGS. 6 and 7 can have several possible implementations. As an example, the switching control unit 49 may switch to the series mode just prior to cranking the starter motor and then return to the parallel mode at the time of stopping the starter motor cranking. In another embodiment, the starting control unit 49 may wait for a small time delay after engaging the starter motor and before switching to the series mode to see if the engine can start in the parallel mode. If the switch is made to the series mode, the starting control unit 49 will return to the parallel mode once cranking stops. In yet another possible implementation, the starting control circuit may stay in the parallel mode unless the battery voltage drops below a threshold value. If the voltage drops below the threshold value, the starter control unit 49 would switch to the series mode. This would be the situation during cold cranking which will cause the voltage to drop and the system would then switch to the series mode if the voltage is below the threshold. If the voltage is above the threshold, the system would not switch to the series mode and attempt to start the engine using the parallel mode.

Referring back to FIG. 5, the charging circuit 44 is shown connected to the prongs 40 of the plug 41. However, it is contemplated that the charging circuit 44 could also be connected directly to the alternator of the lawn tractor such that the lawn tractor itself would recharge the lithium ion battery pack similar to the manner in which the alternator charges a lead acid battery. Although such charging may be desired, the alternator from the lawn tractor generates an output voltage that has staggered peaks and thus, by itself, would be unable to directly charge the lithium ion battery pack. In accordance with the present disclosure, the charging circuit can be configured to include a piezo transformer. A piezo transformer can be sized and configured to receive the voltage output signal from the alternator of the lawn tractor and convert the signal into a generally constant output voltage that can be used to recharge the lithium ion battery pack. A piezo transformer can be incorporated as part of the charging circuit that would direct a charging voltage to the lithium ion battery pack during operation of the lawn tractor. It is contemplated that depending upon the efficiency of the piezo transformer, the lawn tractor may be able to directly recharge the removable battery pack, thereby negating the need to connect the battery pack to an external power source for charging. In addition, the piezo transformer could be used to voltage level shift the incoming charging power from both the engine's alternator and a 50/60 Hz AC wall outlet.

FIG. 9 illustrates one embodiment of the charging circuit 44 that allows the battery cells 50, 52 to be charged from either the alternator 60 of the tractor or from the wall power supply 62. Both the alternator 60 and the wall power supply 62 are connected to secondary coils 64 on the secondary side of the transformer 66. In an illustrative example, the wall power supply in the US is 120 V/60 Hz and 220 V/50 Hz in Europe. The engine alternator voltage may have a widely varying range, such as from 30V-50V and have a frequency in the range of 600-1000 Hz, although these parameters may vary depending upon the alternator and engine. The transformer 66 is connected to a rectifier 68 that converts the AC voltage to a DC voltage. The DC voltage is regulated by the voltage regulator circuit 70 that can then charge the battery cell in the battery cell groups 50, 52. The charging circuit 44 allows the battery cell groups to be charged by the operating engine and would then allow all of the DC powered components on the tractor to be powered by the battery cells without draining the battery cells. The battery cells provide a regulated, clean supply of DC power to the components of the tractor.

In an alternative embodiment, the battery pack could include a battery management system (BMS) that would monitor the state of the battery cells, including the total voltage of the cells, the battery temperature, the state of charge and other parameters relevant to the battery health. In some embodiments, the BMS may protect the battery cells from over-current, over-voltage during charging, under-voltage during discharge and other parameters. The BMS may include internal components to disconnect the battery if the battery is operating outside of its safe operating areas. The BMS would be an addition to the charging and switching circuits described above.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A battery pack for use in starting an internal combustion engine, the battery pack comprising:
    an outer housing;
    a plurality of battery cells enclosed in the outer housing; and
    a charging circuit enclosed in the outer housing and coupled to the plurality of battery cells, wherein the charging circuit is operable to charge the battery cells from either an electrical outlet or from an alternator of the internal combustion engine, wherein the charging circuit includes a transformer having a primary side and a secondary side, wherein the secondary side includes a first winding configured to be coupled to the electrical outlet and a second winding configured to be coupled to the alternator and the primary side is configured to be coupled to the battery cells to charge the battery cells.

2. The battery pack of claim 1 wherein the charging circuit is electrically coupled to a pair of prongs configured to be received in the electrical outlet.

3. The battery pack of claim 1 wherein the battery cells are lithium ion battery cells.

4. The battery pack of claim 2 wherein the pair of prongs are retractable within the outer housing.

5. A battery pack for use in starting an internal combustion engine, the battery pack comprising:
    an outer housing;
    a first battery group and a second battery group each including one or more battery cells enclosed in the outer housing;
    a switching circuit connected to the first and second battery groups, wherein the switching circuit includes a plurality of switching devices and a switching control unit, wherein the switching control unit is operable to selectively connect the first and second battery groups in parallel to start the internal combustion engine or in series after detecting the starting of the internal combustion engine; and
    a charging circuit coupled to the first and second battery groups, wherein the charging circuit is operable to charge the battery cells from either an electrical outlet or from an alternator of the internal combustion engine, and includes a transformer having a primary side and a secondary side, wherein the secondary side includes a first winding configured to be coupled to the electrical outlet and a second winding configured to be coupled to the alternator and the primary side is configured to be coupled to the battery cells to charge the battery cells.

6. The battery pack of claim 5 wherein each of the first and second battery groups each include a plurality of battery cells.

7. The battery pack of claim 6 wherein the battery cells are lithium ion battery cells.

8. The battery pack of claim 5 wherein the switching devices are each independently moveable between an open position and a closed position.

9. A battery pack for use in starting an internal combustion engine, the battery pack comprising:
   an outer housing;
   a first battery group and a second battery group enclosed in the outer housing;
   a switching circuit connected to the first and second battery groups, wherein the switching circuit includes a plurality of switching devices and a switching control unit, wherein the switching control unit is operable to selectively connect the first and second battery groups in parallel to start the internal combustion engine or in series after detecting the starting of the internal combustion engine; and
   a charging circuit enclosed in the outer housing and coupled to the first and second battery groups each including a plurality of battery cells, wherein the charging circuit is operable to charge the battery cells from either an electrical outlet or from an alternator of the internal combustion engine, and includes a transformer having a primary side and a secondary side, wherein the secondary side includes a first winding configured to be coupled to the electrical outlet and a second winding configured to be coupled to the alternator and the primary side is configured to be coupled to the battery cells to charge the battery cells.

10. The battery pack of claim 9 wherein the battery cells are lithium ion battery cells.

11. The battery pack of claim 9 wherein the charging circuit is electrically coupled to a pair of prongs configured to be received in an electrical outlet.

12. The battery pack of claim 11 wherein the pair of prongs are retractable within the outer housing.

13. The battery pack of claim 9 wherein the switching devices are each independently moveable between an open position and a closed position.

* * * * *